United States Patent [19]

Capper

[11] 4,049,284
[45] Sept. 20, 1977

[54] COMBINATION HAND TRUCK AND GARDEN CART

[76] Inventor: Ronald Capper, 1219 Chateau Drive, San Jose, Calif. 95120

[21] Appl. No.: 679,886

[22] Filed: Apr. 26, 1976

[51] Int. Cl.$^2$ .............................................. B62B 1/04
[52] U.S. Cl. .................................... 280/47.18; 220/6
[58] Field of Search .............. 280/47.18, 47.17, 47.24, 280/47.26, 47.27, 639, 651, 652, 654; 220/6

[56] References Cited

U.S. PATENT DOCUMENTS

| | | | |
|---|---|---|---|
| 2,891,802 | 6/1959 | Moran | 220/6 X |
| 2,914,210 | 11/1959 | Paston | 220/6 |

Primary Examiner—Joseph F. Peters, Jr.
Assistant Examiner—R. Schrecengost

[57] ABSTRACT

A handcart includes a carrying frame with two longitudinal members having respective handles. The longitudinal members are coextensively juxtaposed with one another in a longitudinal direction; at least one crossbar connects the longitudinal members rigidly. A back panel is attached to the carrying frame, the longitudinal members, the crossbar and the back panel substantially defined a plane. At least one wheel supports the carrying frame rotatably. One side of a load-supporting plate is attached to the frame so as to be disposed transversely to the plane. A front panel is hingedly attached to one of the four sides of the load-supporting plate opposite the side thereof attached to the frame, and two side panels are hingedly attached to the remaining sides of the load-supporting plate, respectively. The side panels and the front and back panels are lockable to one another, respectively to form a substantially box-shaped container open at the top for carrying loads. The side panels are also symmetrically foldable on top of the load-supporting plate, and the front panel is foldable on top of the folded sidepanels and lockable thereto so as to form a substantially flat platform for carrying a load.

9 Claims, 14 Drawing Figures

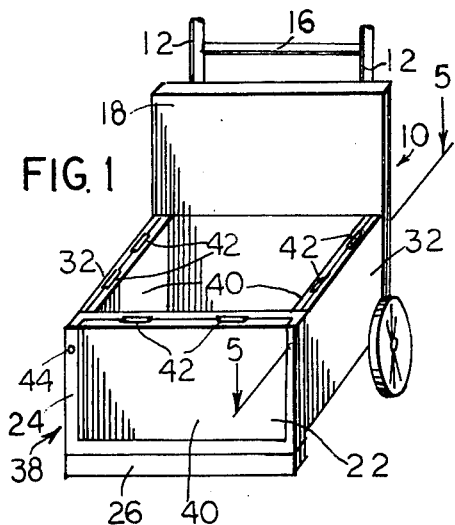
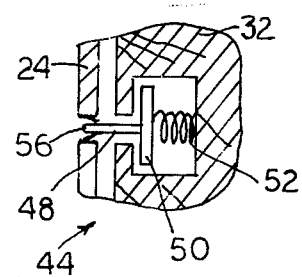
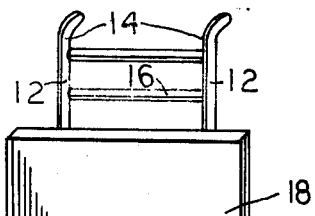
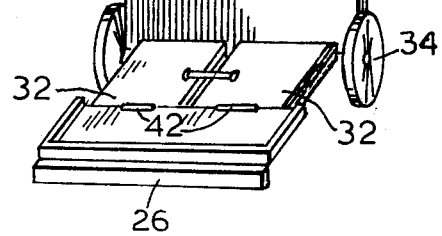
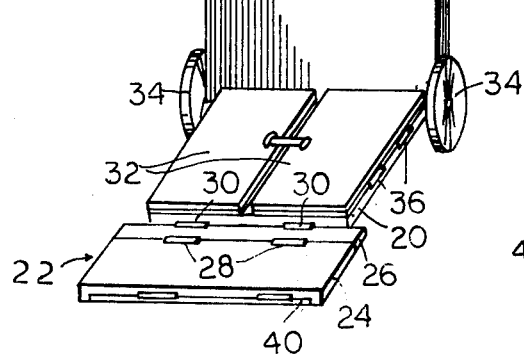
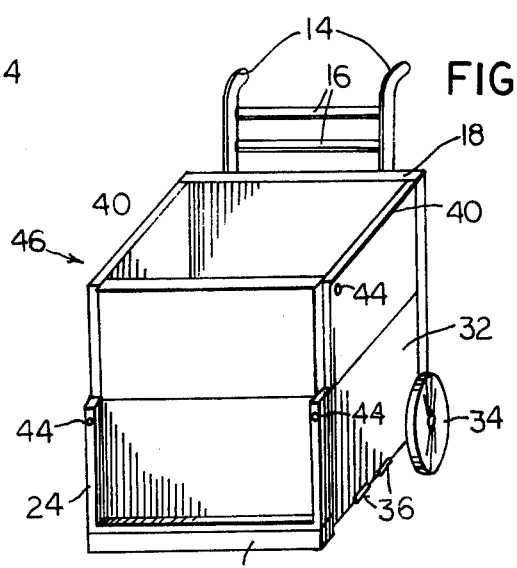
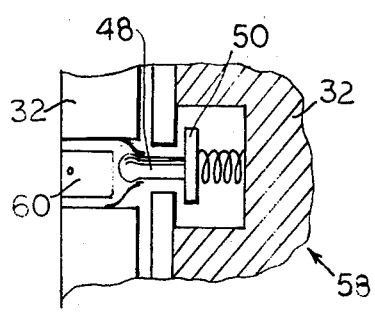
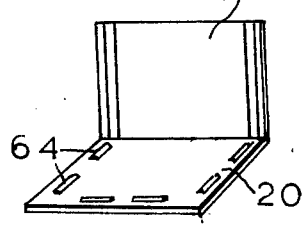
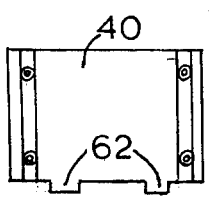

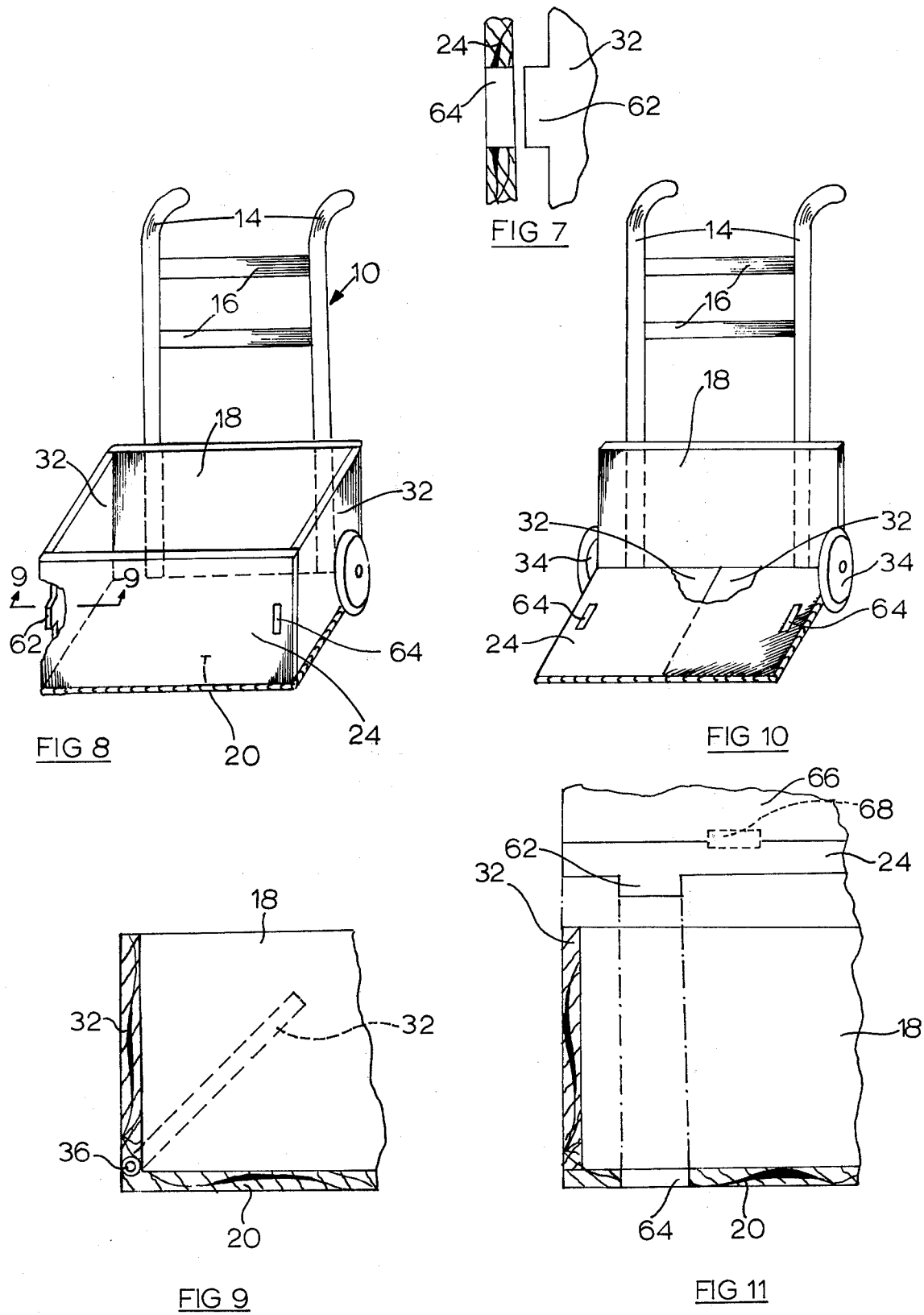

COMBINATION HAND TRUCK AND GARDEN CART

BACKGROUND OF THE INVENTION

1. Field of the Invention

The field of the invention relates to a combination hand truck and garden cart.

2. Description of the Prior Art

Various combination trucks are known; for example there are known a combination household utility implement having interchangeable accessory panels, a combined hand and towing truck having a swingable handle portion to present a hand truck platform when the handle portion is in another position, a utility cart having telescoping tubular frame members, a cart selectively adaptable to multiple uses such as for carrying a golf bag or an outboard motor, a hand truck convertible from a two-wheel hand truck to a four-wheel hand truck, a hand truck designed for use on a farm providable with a concave surface for carrying milk cans, a hand truck with a convertible platform for moving loaded pallets, and a combination set of interchangeable apparatuses mountedly fixed onto a basic mobile frame. None of the aforesaid devices provide, however, a combination hand truck and garden cart in a convenient and simply constructed manner.

SUMMARY OF THE INVENTION

It is accordingly an object of the present invention to provide a simply and reliably constructed hand truck which can convertably be used either as a hand truck or as a garden cart. When used as a garden cart, it should, moreover, have a container of variable height so as to conveniently accomodate therein objects of variable dimensions.

I accordingly provide a handcart comprising a carrying frame including two longitudinal members having respective handles, the longitudinal members or rods being coextensively juxtaposed with one another in a longitudinal direction, and at least one crossbar rigidly connecting the longitudinal members. A backpanel is attached to the carrying frame, the longitudinal members, the crossbar and the backpanel substantially defining a plane. At least one wheel supports the carrying frame rotatably, and a load-supporting plate having four sides is attached with one side thereof to the frame so that the load-supporting plate is disposed transversely to the plane. A front panel is hingedly attached to one of the four sides of the load-supporting plate opposite the side thereof attached to the frame. Two side panels are hingedly attached to the remaining sides of the load-supporting plate, respectively, the side panels and the front and back panels being lockable to one another, respectively to form a substantially box-shaped container open at the top thereof for carrying loads. The side panels are symmetrically foldable on top of the load-supporting plate, and the front panel is foldable on top of the folded side panels and lockable thereto so as to form a substantially flat platform for carrying a load.

It is advantageous if the handcart includes three extension panels for the front panel and the side panels, respectively so that the extension panels are displaceable in an upward direction for forming an elongated box-shaped container open at the top.

It is further advantageous if the extension panels are hingeably attached to the front panel and the side panels, respectively.

It is also beneficial if the side panels and the front panel are formed with recesses for receiving the extension panels, respectively, the extension panels being disposed in an initial position therein.

It is additionally beneficial if the extension panels are flush with the side panels and the front panel, respectively, when the extension panels are in the initial position.

It is further advantageous if the extension panels are lockable to the back panel and to one another, respectively, when forming the elongated container.

It is additionally advantageous if the handcart includes a plurality of snap-in locks disposed on the back panel, the side panels and the front panel for locking the aforesaid panels to one another, respectively, when forming the box-shaped container, and a multiplicity of snap-in locks disposed on the extension panels and the back panel for locking the extension panels and the back penel to one another, respectively, when forming the elongated box-shaped container.

It is further advantageous if each lock means includes a plunger having a collar attached thereto, and a compression spring in contact with the plunger wherein at least one of the panels is formed with a recess to receive the compression spring, and wherein one of the remaining panels adjacent to the panel formed with the first recess if formed with a second recess to receive the plunger when the latter is in a locked position.

It is further beneficial if the front panel includes a first hinge for attachment to the load-supporting plate, and if the front panel includes first and second plates and a second hinge disposed substantially parallel to the first hinge for the second plate to be foldable on top of the folded side panels.

It is finally advantageous if the handcart includes at least one snap-in lock disposed on the side panels for locking the latter together when forming the substantially flat platform.

BRIEF DESCRIPTION OF THE DRAWING

My invention will be better understood with reference to the accompanying drawing in which:

FIG. 1 shows a perspective view of the handcart when the panels are assembled to form a box-shaped container open at the top;

FIG. 2 shows a perspective view of the handcart with the side panels folded on top of the load-supporting plate, but with the front panel in an opened horizontal position;

FIG. 3 corresponds to the view of FIG. 2, but with the front panel folded on top of the folded side panels;

FIG. 4 is a perspective view of the handcart with the extension panels swung into an extended position to form an elongated carrying box open at the top;

FIG. 5 is a cross-section of a snap-in lock along the line 5—5 of FIG. 1;

FIG. 6 is a plan view in part section of FIG. 2 showing a snap-in lock adapted to lock the two side panels to one another;

FIG. 7 shows the principle of operation of an alternate method, according to my invention, of attaching two adjacent panels to one another;

FIG. 8 shows a perspective view of the handcart, using an alternate method of assembly of the panels;

FIG. 9 is a cross-section along line 9—9 of FIG. 1;

FIG. 10 shows a perspective view of the handcart using the alternate method of panel assembly with the side and front panels folded down;

FIG. 11 shows an alternate way of assembling the front panel and load-supporting plate;

FIG. 12 shows an assembled load-supporting plate 20 of the alternate embodiment;

FIG. 13 shows the front panel extension plate 40 of the alternate embodiment; and FIG. 14 shows the side panel 32 of the alternate embodiment.

DESCRIPTION OF THE PREFERRED EMBODIMENT

Referring now to the figures, a frame 10 will be seen to consist of two longitudinal members of bars 12 formed with handles 14 juxtaposed with one another, two crossbars 16 rigidly connecting the bars 12. A back panel 18 is attached to the carrying frame 10, where the longitudinal bars 12, the crossbars 18 and the back panel 18 substantially define a plane. A load-supporting plate 20 is disposed transversely to the plane of the carrying frame 10 and attached thereto on one side, and a front panel 22, consisting of an upper part 24 and of a lower part 26 is attached to the load-supporting plate 20 on the side thereof opposite the frame-attached side, by means of hinges, the upper part 24 being hinged to the lower part 26 by means of hinges 30. A pair of wheels 34 support the frame 10, wheels 34 being rotatable thereon.

Two sidepanels 32 are attached by means of hinges 36 to the remaining sides of the load-supporting plate 20, the sidepanels 32, the back panel 18 and the front panel 22 being lockable to one another respectively to form a substantially box-shaped container 38 for carrying loads. The sidepanels 32 are symmetrically foldable on top of the load-supporting plate 20, and the front panel 24 is foldable on top of the side panels 32 and lockable thereto so as to form a substantially flat platform for carrying loads. Three extension panels 40 are disposed within respective recesses of the front panel 24 and the side panels 32, attached thereto by respective hinges 42, and are mounted to be flush therewith.

A plurality of snap-in locks 44 are disposed on the back panel 18, the side panels 32 and the front panel 24 for locking the aforesaid panels to one another, respectively, and a second plurality of snap-in locks 44 are disposed on the extension panels 40 and the back panel 18 for locking the extension panels and the back panel to one another, respectively when forming an elongated box-shaped container 46.

Each of the snap-locks 44 includes a plunger 48 having a collar 50 attached thereto; a compression spring 52 is in contact with the plunger 48. The panel receiving the greater part of the snap-lock, for example, the side panel 32, is formed with a recess 54 to receive the compression spring 52, and the panel adjacent thereto, for example the upper part 24 of the front panel 22 is formed with an opening 56 to receive the plunger 48, when the latter is in a locked position.

A slightly modified snap-in lock 58 is shown in FIG. 6; a cover plate 60 mounted on one of the side panels 32 is slidable over the recess 56. The cover plate 60 is slidably displaced away from the recess 56, if it is desired to push the plunger 48 back to unlock the snap-in lock 58. In the case of the snap-in lock 44 it is sufficient to depress the plunger 48 through the opening 56 to unlock the snap-lock.

An alternate embodiment of the invention is shown in FIGS. 7 through 11. In this alternate embodiment one panel is formed with a slot, and an adjacent panel is formed with a tongue slidable into the slot. This can be best seen from FIG. 7, which shows a side panel, e.g. the left side panel 32 formed with a tongue 62, slidable into a slot 64 formed in the front panel 24. The assembled cart using the above features is shown in FIG. 8. FIG. 9 shows the operation of the hinges 36, which is similar to the embodiment of the invention shown in FIG. 1. FIG. 10 shows the garden cart, now a truck, with the front panel 24 folded down, the slots 64 being clearly visible therein. FIG. 11 shows the insertion of a front panel 24 formed with a tongue 62 into a slot 64 of the base of load-supporting plate 20. In order to make the front panel 24 hingeable about the load-supporting plate 20, a subsidiary front panel 66 hingeable about a hinge 68 is included in the front panel 24, the hinge 68 corresponding to the hinges 30 shown in FIG. 2.

Provision of the tongue, and slot or groove features illustrated makes it possible to use front and side panels of different heights, which are attachable and lockable to one another. Tongue and slot features of the above-described kind can, of course, also be used for the back panel 18 in conjunction with the side panels 32.

Changes may be made in the construction and arrangement of parts or elements of the various embodiments as disclosed herein without departing from the spirit and scope of the invention.

What is claimed is:

1. A handcart comprising:
    a carrying frame including two longitudinal members having respective handles, said members being coextensively juxtaposed with one another in a longitudinal direction and at least one crossbar rigidly connecting said members;
    a back panel attached to said carrying frame, said longitudinal members, said crossbar and said back panel substantially defining a plane;
    at least one wheel rotatably supporting said frame;
    a load-supporting plate having four sides, one of said sides being attached to said frame for said load-supporting plate to be disposed transversely to said plane;
    a front panel hingedly attached to one of said four sides opposite said one side of said load-supporting plate;
    two side panels hingedly attached to the remaining sides of said load-supporting plate, respectively, said side panels and said front and back panels being lockable to one another, respectively, to form a substantially box-shaped container open at the top thereof for carrying loads, said side panels being symmetrically foldable on top of said load-supporting plate, and said front panel being foldable on top of the folded side panels and lockable thereto so as to form a substantially flat platform for carrying a load; and
    three extension panels for said front panel and said side panels, respectively, said extension panels being displaceable in an upward direction therefrom for forming an elongated box-shaped container open at the top thereof.

2. A handcart according to claim 1 wherein said base is hingeably attached to said front panel and said side panels, respectively.

3. A handcart according to claim 2 wherein said side panels and said front panel are formed with recesses for receiving said extension panels, respectively, said extension panels being disposed in an initial position therein.

4. A handcart according to claim 2 wherein said extension panels are flush with said side panels and said front panel, respectively, when said extension panels are in said initial position.

5. A handcart according to claim 1 wherein said extension panels are lockable to said back panel and to one another, respectively, when forming said elongated container.

6. A handcart according to claim 1 further comprising a first plurality of snap-in locks disposed on said back panel, said side panels and said front panel, for locking said back panel, said side panels and said front panel to one another, respectively, when forming the box-shaped container and a second plurality of snap-in locks disposed on said extension panels and said back panel for locking said extension panels and said back panel to one another, respectively, when forming said elongated box-shaped container.

7. A handcart according to claim 4 wherein each of said locks comprises:
   a plunger having a collar attached thereto; and
   a compression spring in contact with said plunger and wherein at least one of said panels is formed with a recess to receive said compression spring and wherein one of the remaining panels adjacent to said one of said panels is formed with a second recess to receive said plunger when the latter is in a locked position.

8. A handcart according to claim 1 wherein said front panel includes
   a first hinge for attachment to said load-supporting plate,
   a spacer plate being hingeably attached to said first hinge on one side thereof,
   a second hinge for attachment to said spacer plate on the other side thereof, said second hinge disposed substantially parallel to said first hinge and said front panel being hingeably attached to said second hinge,
   said spacer plate being of a thickness to enable said front panel to be foldable on top of said foldable side panels.

9. A handcart according to claim 1 further comprising at least one snap-in lock disposed on said side panels for locking said sidepanels together when forming said substantially flat platform, and wherein said side panels are formed with first and second tongues, respectively, said load-supporting plate is formed with a first slot, and said front panel is formed with second and third slots and a third tongue for said first and second tongues to slidably fit into said second and third slots, respectively, and for said third tongue to slidably fit into said first slot.

* * * * *